(12) United States Patent
Kunkel (10) Patent No.: US 11,869,363 B1
(45) Date of Patent: Jan. 9, 2024

(54) SYSTEM AND METHOD FOR AUTONOMOUS VEHICLE AND METHOD FOR SWAPPING AUTONOMOUS VEHICLE DURING OPERATION

(71) Applicant: Travis Kunkel, Newcastle, TX (US)

(72) Inventor: Travis Kunkel, Newcastle, TX (US)

( * ) Notice: Subject to any disclaimer, the term of this patent is extended or adjusted under 35 U.S.C. 154(b) by 0 days.

(21) Appl. No.: 18/083,844

(22) Filed: Dec. 19, 2022

Related U.S. Application Data (63) Continuation-in-part of application No. 17/035,516, filed on Sep. 28, 2020, now abandoned, and a continuation-in-part of application No. 16/573,119, filed on Sep. 17, 2019, now abandoned.

(51) Int. Cl.
| | |
|---|---|
| *G08G 5/00* | (2006.01) |
| *G08G 5/04* | (2006.01) |
| *B64U 60/50* | (2023.01) |
| *B64U 20/60* | (2023.01) |
| *B64U 10/14* | (2023.01) |
| *B64U 20/30* | (2023.01) |
| *B64U 30/291* | (2023.01) |

(52) U.S. Cl.
CPC ............ *G08G 5/0008* (2013.01); *B64U 10/14* (2023.01); *B64U 20/30* (2023.01); *B64U 20/60* (2023.01); *B64U 30/291* (2023.01); *B64U 60/50* (2023.01); *G08G 5/0034* (2013.01); *G08G 5/04* (2013.01); *B64U 2201/10* (2023.01)

(58) Field of Classification Search
CPC ...... G08G 5/0008; G08G 5/0034; G08G 5/04; B64U 10/14; B64U 20/30; B64U 20/60; B64U 30/291; B64U 60/50; B64U 2201/10
See application file for complete search history.

(56) References Cited

U.S. PATENT DOCUMENTS 3,610,431 A * 10/1971 Rodden ............... B60P 3/1033
211/207
4,536,438 A * 8/1985 Bishop ............... B29C 70/083
442/247

(Continued)

OTHER PUBLICATIONS

Erdelj et al., "UAVs that fly forever: Uninterrupted structural inspection through automatic UAV replacement", Hall, Jul. 2019, pp. 1-29 (Year: 2019). [Examiner-cited Reference, U.S. Appl. No. 16/573,119].

(Continued)

*Primary Examiner* — Medhat Badawi
(74) *Attorney, Agent, or Firm* — Bold IP, PLLC; Christopher Mayle (57) ABSTRACT

A functionality utilizing a centrally controlled strategy for continuous communication to specific autonomous vehicles, or drones, that are designed for extreme conditions and assigned specific missions with the ability to be replaced during the mission. This functionality is an improvement on existing swarm and leader-follower tactics as it retains control of the drones at a central command center, allowing the drones to both receive individual commands from the hub but also operate independently of it with direct pilot control. This direct communication allows for real time process of ordered substitution to replace any drone during the mission.

1 Claim, 10 Drawing Sheets

(56) References Cited

U.S. PATENT DOCUMENTS

| | | | | |
|---|---|---|---|---|
| 4,883,240 | A * | 11/1989 | Adamson | B64C 11/00 |
| | | | | 416/129 |
| 6,149,215 | A * | 11/2000 | Balogh | B66C 1/18 |
| | | | | 294/74 |
| 7,699,261 | B2 * | 4/2010 | Colten | B64C 39/024 |
| | | | | 244/45 R |
| 8,577,538 | B2 * | 11/2013 | Lenser | G05D 1/0027 |
| | | | | 701/28 |
| 9,434,481 | B2 * | 9/2016 | McGeer | B64F 1/04 |
| 9,550,577 | B1 * | 1/2017 | Beckman | B64C 27/14 |
| 10,442,521 | B1 * | 10/2019 | Ellzey | B64C 5/12 |
| 10,756,919 | B1 * | 8/2020 | Kerzner | G05D 1/0282 |
| 10,793,270 | B2 * | 10/2020 | Chen | B64C 39/024 |
| 10,909,859 | B1 * | 2/2021 | Dodd | G07C 5/0816 |
| 10,927,998 | B1 * | 2/2021 | Crockett | A47B 3/10 |
| 11,124,298 | B2 * | 9/2021 | Chen | B64C 3/56 |
| 11,125,800 | B1 * | 9/2021 | Lecocke | G06Q 10/0637 |
| 11,312,492 | B1 * | 4/2022 | von Flotow | B64U 10/13 |
| 11,409,291 | B2 * | 8/2022 | Restifo | G05D 1/0202 |
| 11,591,064 | B2 * | 2/2023 | Louie | B64U 10/13 |
| 2003/0025032 | A1 * | 2/2003 | Lepretre | B64C 39/024 |
| | | | | 244/7 B |
| 2007/0156286 | A1 * | 7/2007 | Yamauchi | G05D 1/0278 |
| | | | | 700/245 |
| 2015/0327136 | A1 * | 11/2015 | Kim | H04B 7/18504 |
| | | | | 370/331 |
| 2016/0122016 | A1 * | 5/2016 | Mintchev | B64C 39/024 |
| | | | | 244/17.23 |
| 2016/0340028 | A1 * | 11/2016 | Datta | B64C 15/12 |
| 2017/0163046 | A1 * | 6/2017 | Patil | H02J 7/00 |
| 2017/0190104 | A1 * | 7/2017 | Bostick | B29C 64/106 |
| 2017/0233073 | A1 * | 8/2017 | Ao | G01L 19/14 |
| | | | | 454/184 |
| 2017/0247107 | A1 * | 8/2017 | Hauer | B64C 39/024 |
| 2018/0188747 | A1 * | 7/2018 | Venturelli | G06Q 10/06311 |
| 2018/0194484 | A1 * | 7/2018 | Livieratos | F02B 41/04 |
| 2018/0275654 | A1 * | 9/2018 | Merz | G05D 1/0033 |
| 2019/0031346 | A1 * | 1/2019 | Yong | G08G 5/0043 |
| 2019/0066032 | A1 * | 2/2019 | Taveira | B64D 1/02 |
| 2019/0084673 | A1 * | 3/2019 | Chen | B64C 39/024 |
| 2019/0144115 | A1 * | 5/2019 | Chen | B64C 39/024 |
| | | | | 244/118.1 |
| 2019/0160315 | A1 * | 5/2019 | Head | B64C 39/024 |
| 2019/0199112 | A1 * | 6/2019 | Roberts | G07C 5/008 |
| 2019/0276128 | A1 * | 9/2019 | Pike | B64C 39/024 |
| 2019/0312439 | A1 * | 10/2019 | Cottrell | B64D 31/14 |
| 2019/0337607 | A1 * | 11/2019 | Lee | B64C 27/12 |
| 2020/0043350 | A1 * | 2/2020 | Cantrell | G08G 5/045 |
| 2020/0108928 | A1 * | 4/2020 | Nwosu | B64U 50/19 |
| 2020/0126431 | A1 * | 4/2020 | Luckey | G08G 5/0056 |
| 2020/0207484 | A1 * | 7/2020 | Foggia | B64U 70/30 |
| 2020/0288895 | A1 * | 9/2020 | Bennet | H04W 12/08 |
| 2020/0354056 | A1 * | 11/2020 | Borras | H04L 67/12 |
| 2020/0387173 | A1 * | 12/2020 | Wang | B64C 39/024 |
| 2021/0009269 | A1 * | 1/2021 | Chen | B64C 39/024 |
| 2021/0011494 | A1 * | 1/2021 | Artemjonoks | G05D 1/0027 |
| 2021/0056494 | A1 * | 2/2021 | Denn Yangourazov | |
| | | | | G07F 11/16 |
| 2021/0059485 | A1 * | 3/2021 | Keskin | B65H 16/06 |
| 2021/0107636 | A1 * | 4/2021 | Seung | B64C 1/30 |
| 2021/0214068 | A1 * | 7/2021 | Bry | B64C 1/30 |
| 2021/0237901 | A1 * | 8/2021 | von Flotow | B64F 1/02 |
| 2022/0001982 | A1 * | 1/2022 | Chen | B64C 39/024 |
| 2022/0097842 | A1 * | 3/2022 | Kunkel | B64C 39/024 |
| 2022/0242563 | A1 * | 8/2022 | Wang | B64C 39/024 |
| 2022/0250747 | A1 * | 8/2022 | Kominami | B65D 83/262 |
| 2022/0250749 | A1 * | 8/2022 | Kominami | B05B 9/04 |
| 2022/0250762 | A1 * | 8/2022 | Sperrin | B60L 53/54 |
| 2022/0253973 | A1 * | 8/2022 | Kominami | G06T 7/73 |
| 2022/0254155 | A1 * | 8/2022 | Janssen | A01M 21/043 |

OTHER PUBLICATIONS

Null et al., "Intelligent mission control of robotic underwater vehicles", IEEE, Oct. 2013, pp. 1-4 (Year: 2013). [Examiner-cited Reference, U.S. Appl. No. 16/573,119].

How to replace the E58 drone arms? Eachine E$58 drone arm replacement, May 23, 2018, eachine offical, https://youtu.be/ CF-ulQFYWog (Year: 2018). [Examiner-cited Reference, U.S. Appl. No. 17/035,516].

* cited by examiner

SYSTEM AND METHOD FOR AUTONOMOUS VEHICLE AND METHOD FOR SWAPPING AUTONOMOUS VEHICLE DURING OPERATION

CROSS REFERENCE TO RELATED APPLICATIONS

This application is a continuation in part which claims priority to United States application Ser. No. 17/035,516 filed on Sep. 20, 2020 and United States Application 16/573,119 filed on Sep. 17, 2019.

FIELD OF DISCLOSURE

The present invention relates to a novel method for unmanned vehicles intending to receive instructions and carry out a mission, while being able to be replaced by a spare unmanned vehicle during the mission. If a mission lasts longer than the power source carried by the vehicle or suffer a malfunction, a spare unmanned vehicle would be triggered to replace the original unmanned vehicle. The method disclosed herein configures a centrally controlled strategy for constant communication with unmanned vehicles during a specified mission including a process of ordered substitution. This application uses unmanned aerial vehicles, also known popularly as drones, to describe the invention, but the invention can include wheeled terrestrial vehicles, submarines, or any other vehicle that can be operated autonomously.

BACKGROUND

Individuals can use autonomous vehicles ("AV") as instruments for specific missions, such as surveillance, lighting, and entertainment. Embodiments of AVs are configured to operate in air, on land, and in water, in this embodiment the AV is configured to operate in air, the scope of this patent should not be limited to this configured embodiment but to all configurations thereof. A typical autonomous vehicle comprises a local memory and electric motor powered by a battery that is programmed to perform predetermined missions and flight plans. Alternatively, an AV could be driven using a gas engine fed by an AV-mounted fuel tank. Multiple AVs can be used at the same time as a team for a particular mission. Once an AV completes the mission, a user can replace the AV's battery or recharge its existing battery for its next use. If an AV drains all of its power during the mission, the AV will either slowly lower itself to the ground to be collected by the owner, return to its landing location or in extreme circumstances, crash in an emergency landing. This causes the owner to have to physically find and collect the AV and charge or replace battery in order to use it again. As a result there may be an empty slot in the AV team during mission that will only be filled when the AV is charged or has its battery replaced. While it is possible to fill that slot with the recharged AV, or a separate AV, the owner would prefer a system of an ordered substitution to make this transition smoother. If replacing an AV during a mission became simpler, missions would be more reliable, easier, and more efficient. The present invention allows for a system of an ordered substitution from a centrally controlled strategy to replace AVs during a mission.

Additionally individuals can use autonomous vehicles ("AV") as instruments for specific missions, such as surveillance, lighting, and entertainment. Embodiments of AVs are configured to operate in air, on land, and in water, in this embodiment the AV is configured to operate in air, the scope of this patent should not be limited to this configured embodiment but to all configurations thereof. A typical autonomous vehicle comprises a local memory and electric motor powered by a battery that is programmed to perform predetermined missions and flight plans. Alternatively, an AV could be driven using a gas engine fed by an AV-mounted fuel tank. Drones are typically made of an inexpensive light-weight plastic or carbon-fiber to maximize flight time. These industry standard practices lead to a drone that are easily destroyed by collisions and cannot survive the mildest of physical attacks. Many drones are constructed as one piece and if an arm or if the body is damaged it is not easily repaired, if at all. The present invention allows for an improved drone that is designed to be crashed, shot, run over, etc. and be put back into service almost immediately through simple replacement of the arms or in-field repairs. This occurs through utilizing geometry and materials to move those forces experienced in a crash away from the drone itself.

SUMMARY

The present invention is directed to a piece of workout equipment attachment that re-enacts the fingertip pushup popularized by Bruce Lee, whereby the attachment allows people to do fingertip pushups at a gym on a traditional chest machine. During use, one piece attaches to the left and right side of the chest machine whereby instead of grabbing a bar the user puts their hands on a flat piece of the attachment with only finger tips touching and it trains fingers, wrist, and forearms as isometric training.

The present invention comprises a system of an ordered substitution for AVs from a centrally controlled strategy, and includes a command center hub, one or more AVs, and a method for replacement.

In one of many alternative embodiments, the functionality utilizes a centrally controlled strategy. This differs from swarm and leader/follower tactics as it retains control of the unmanned vehicles at a central command center, allowing the AVs to both receive individual commands from the hub but also to be operated independently of it with direct pilot control. This allows for specific formations in all axes (X, Y, Z) in a designated diameter around a specified location ("centroid"). Each vehicle has an independent and unique fixed path automatically generated for it, including such variables as altitudes and approach trajectories to reduce the possibility of collision with other drones executing the overall mission. This embodiment enables mobile, mission-directed autonomous hardware to interact in such a way as to create a continuous presence and desired activity level at a prescribed location or series of locations. This functionality allows for continuous engagement without cessation of the mission due to vehicle or pilot fatigue while allowing for pilot direct control at any given time.

In the current embodiment, the vehicles constantly communicate with the hub and at no time do they operate without data interchange with the hub or pilot via a radio controller or other means. This results in multiple iterations per second of real-time information from all drones active on the mission, including those entering and exiting. This constant communication allows the pilot to have robust control and efficacy of the drones for the allotted mission. The control center hub includes software controlling the initial mission planning (vehicle positioning), data interchange, and drone movement during the mission.

In this embodiment "mission" is understood to be the positioning of the vehicles at the desired location and execution of the task to be performed. In this embodiment it is understood that each vehicle is assigned to have its own individual and unique mission that is completed upon return to the base, the command center sets a static triggering level relative to the end user and their personal desires for reserve battery level that they want the drone to return on. In this embodiment the global or overall mission objective is the sum of the individual missions, this is contrasted to the typical swarm and leader/follower technology and mission strategy. In other embodiments, each AV may be directed to a mission without constant contact with a hub, but rather act to perform a pre-programmed mission, and then simply return to the programmed return location when it is complete, or when its fuel is spent, or some other triggering event occurs, such as a selected time when a new AV should take its place.

This application uses a construction that welcomes fast-changing of damaged parts and survives small arms fire and collisions, and provides a platform for payloads, consequently creating a drone that survives a minimum of 375-lb crush test. This application features a central lightweight body containing hardware and controllers with attachable arms able to be easily replaced from the body. In one of several alternative embodiments, the drone uses arms made of aluminum and covered by a protective braided Kevlar material, the arms designed for easy replacement. Additionally, the drone arms are constructed with commercially common rails such as those found on an AR-15 rifle. This structure allows users to mount optics or payloads without making modifications to the drone. The bottom of the central body also features these rails for additional modifications.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the Summary above and in this Detailed Description, and the claims below, and in the accompanying drawings, reference is made to particular features (including method steps) of the invention. The term "comprises," and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose lower limit is the first number and upper limit is the second number.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

Legend of System Elements
10 Central Body
20 Arm
30 Propeller
35 Motor
40 Retention Bolts
45 Retention Bracket
50 Motor Mount
55 Stand 60 Rail
65 Kevlar Braid
70 Arm Rail Mount
75 Arm Connection
80 Connection Seal
85 Sealing Ring
90 Body Rail Mount
100 Drone
110 Electrical Connector
120 Aluminum Tube.

Figure 1:
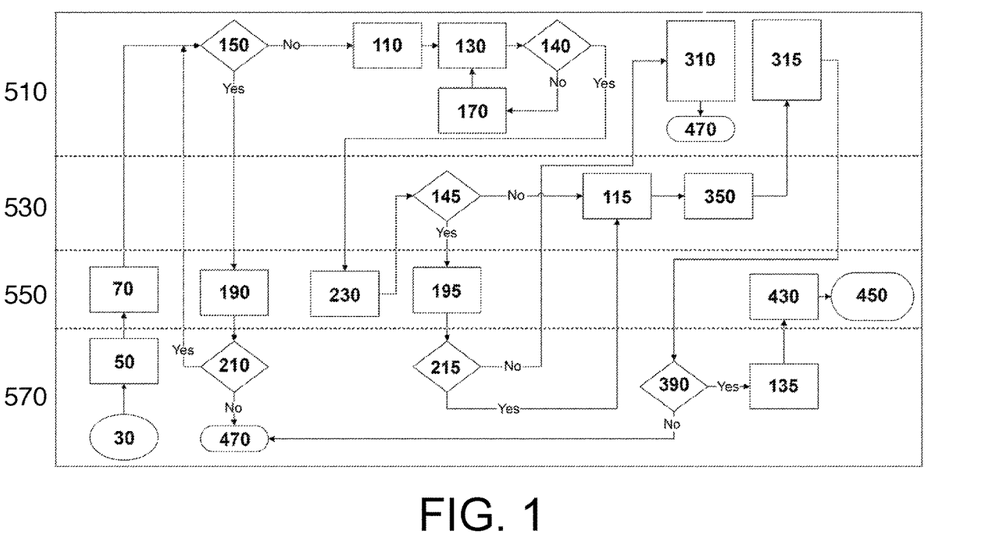
FIG. 1 shows the flow chart for the drone continual relief process.

The present invention will now be described by referencing the appended FIGURES representing preferred embodiments. FIG. 1 shows the flow chart for the drone relief process.

Starting (Step 30): In the current embodiment, the user, hereafter referenced as the Pilot 570 will start the process by determining the mission and how many vehicles will be required for the mission, the specific location (latitude, longitude, elevation), the elevation (or depth) of the vehicles, distance from the location each vehicle is to assume and the minimal distance from each other, and other details as the Pilot 570 chooses. The example for this specification in this embodiment will be limited to two active drones, however the scope of this invention is not limited to two drones; the number of drones being used for a mission will be decided by the Pilot 570.

Programming the Ground Control System (step 50): Once determined, the Pilot 570 will set the requisite parameters within the hub operating system or Ground Control System 550 ("GCS") and the Pilot 570 will turn on the vehicles and download the individual missions into each vehicle.

Programming Drone #1 (Step 70): Once the Pilot 570 has entered the details, the GCS 550 will load Drone #1 510 to be readied for a mission. Drone #1 Internal Check (Step 150): Before taking off, Drone #1 510 will send its operating conditions to the GCS 550 to make sure it is ready for take-off, the GCS 550 checking for sufficient battery power and other mission critical parameters, such as a radio function check to ensure that Drone #1 510 is prepared to meet the needs of the programmed mission.

GCS Evaluation (Step 190): If the power is found to be less than the threshold required by the Ground Control System 550 in step 150, or any other critical parameter does not meet operational needs of the mission, Drone #1 will stand down and the GCS 550 further evaluate the operating conditions and will alert the Pilot 570.

Pilot Evaluation (Step 210): Once alerted, the Pilot 570 evaluates the reported conditions of Drone #1 to determine why the GCS 550 indicated an alert and change the battery 210 and make any other corrections. If the Pilot 570 chooses to change the battery, the drone can continue with repeating the Drone #1 Internal Check (Step 150), or the Pilot 570 chooses to not change the battery or determines that Drone #1 should not be used in the contemplated mission, the Pilot will end the mission 470 for Drone #1 510.

Mission (Step 110): After Drone #1 510 assesses that its battery power and other parameters are sufficient to meet operational requirements of the mission, it will move to the proper location and once on location, Drone #1 will conduct its programmed mission.

The mission could be to simply point a camera in a direction or to follow a moving target, carry a payload to a specific farm location, or shine a light on a dark night at a worksite until dawn—the possibilities are endless.

Drone 190 1 Condition Reporting (Step 130): Drone #1 continuously self-monitors its operating conditions while conducting its programmed mission.

Evaluate Monitored Conditions (Step 140): Depending on the instructions and system, Drone #1 will report its monitored conditions to the GCS for evaluation and further instructions to remain on mission or return home, or Drone #1 may be configured to self-monitor conditions. Such conditions could include checking the remaining charge on its battery to see if the battery power is less than a set threshold, or fuel is running low in a tank, a payload has been dispersed, or dawn has arrived, etc.

Ongoing Mission (Step 170): As long as Drone #1 assesses that no conditions suggesting it should interrupt its operations (Step 140), it will continue with its mission until the mission is completed. While this explanation discusses primarily battery charge, this step monitors all operating conditions during the mission as discussed above.

Drone Replacement (Steps 140, 230): As the mission progresses, Drone #1 will either complete its mission or reach a pre-determined triggering event and either signal the GCS or simply take the next step in a mission to begin the process of an ordered substitution. Such triggering events can include a low battery threshold, a set time, a detected radio signal, or even an audible signal. If the triggering event is a condition determining that the mission is complete, Drone #1 simply returns home. (This condition is not shown on FIG. 1.)

Drone Replacement (Step 230, continued): Once triggered, a second AV, referenced here as Drone #2 530, will replace the first AV at a desired location, either in the same position or another location as designated, as directed. The path may be non-direct, through a calculated waypoint by the route taken by the first AV to the side of the destination by the second AV. In this operation the route is transmitted by the first AV that it took during the mission and then sent back to the command center hub along with any determined obstacles from one or more sensors whereby based on this command center hub may determine an efficient route. This information may then be transmitted to the second AV during deployment such that it may take the efficient route as determined by the first AV. When there are more than two AV, each AV may update any obstacles along the path and where multiple drones take multiple paths, safe routes may be determined for future AV to travel. Additional information may be gleaned from various other sources (weather, traffic-condition reporting services and apps, law enforcement social media feeds and news releases, media reports, etc.), collated and integrated into a database that the drones can utilize in mapping-out and displaying danger spots or areas for the drones.

The sensor system may include a plurality of detectors mounted to the housing of the drone in the form of standard infrared ("IR") detectors having photodiode and related amplification and detection circuitry. In other embodiments, radio frequencies, magnetic fields, and ultrasonic sensors and transducers may be employed. Detectors may be arranged in any number of configurations and arrangements. For example, the drone may include an omnidirectional detector mounted to the top and bottom of the drone to detect signals from a 360-degree field of view. In other embodiments, various detectors may be mounted on the side of drone which may be used to form a collective field of view of detection.

In some non-limiting embodiments, the system may include a regression-based model that utilizes the prior route data from other drones and third party databases as input data to create a route for future drones that is optimized for specific cargo that has been inputted by the user or determined by the one more sensors such as a camera to identify the cargo and the store the information. The trained machine learning algorithm may be of any suitable form, and may include, for example, a neural network. A neural network may be software representing a human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through the connections' weight. A neural network may include, for example, a convolutional neural network, a deep neural network, or a recurrent neural network.

Route data previously described that is inputted may be stored and used alone or combined with other third-party data discussed or used with the assistance of the predictive model from data from previous drones having the same type of cargo or similar cargo or similar routes that has been stored in one or more databases of the system to future drones. In some embodiments, the predictive models are trained on prior data and outcomes using a historical database of cargo or route data and resulting correlation relating to a same type of cargo, different cargo, or a combination of same and different cargo to apply to future drones. This information may be presented on a user interface where a user may visualize the various previous routes taken by the AVs where different color indicators may be used for successful routes and failure routes as well as different indicators for time of the day, week, month, or year, as well as the cargo.

Drone #2 Preparation (Step 145, 195, 215): Before the secondary drone 530 launches, it performs a pre-mission Drone #2 Internal Check (Step 145) similar to those steps taken by Drone #1 described by Steps 150, 190 and 210—checking its battery power and other starting conditions to ensure mission readiness, and if Drone #2 is not prepared for mission (a "yes" on FIG. 1 following Step 145), the GCS 550 will issue a "Do not engage in mission" order (Step 195) to Drone #2 530.

Pilot Evaluation (Step 215): As with Drone #1 510, the Pilot 570 has the choice to change the battery. If the Pilot 570 chooses to change the battery, Drone #2 530 can continue to move to location after the battery change and continue with the programmed mission (Step 115). Drone #1 Return To Mission (Step 310): If the Pilot 570 does not change the battery of Drone #2 530 or make other necessary corrective action, then Drone #1 510 can be directed to complete the mission as much as possible and then return from goal 310, and end the mission (Step 470).

Drone #2 Relieves Drone #1 (Step 350): Following the evaluation of Drone #2 530 in Step 215 and conclusion that Drone #2 530 is mission ready with sufficient battery power over a set threshold and all other operating conditions are satisfied, Drone #2 530 will relieve Drone #1 510 at its programmed location. Drone #1 510 then returns to its home location or other designated location as programmed.

Drone #2 Continues Mission (Step 315). Once Drone #2 530 has replaced Drone #1 510 at the mission location, Drone #2 530 will continue with the programmed mission until a triggering event occurs, which could be the end of the mission, low battery, low fuel, an emptied payload, or any other detected change in conditions warranting the end of Drone #2's 530 work on location.

Continuous Cycle Preparation (Step 390). Once a triggering event occurs during Step 315 to end Drone #2's 530 time on mission location, the Pilot 570 has the choice to prepare to relieve Drone #2 530 by preparing Drone #1 510 for its next shift by changing batteries, top off fuel tanks, refill a payload, etc., or to end the mission (shown as Step 470). Re-Prepar Drone 1 (Steps 135): The Pilot will ensure that the pre-mission checklist for Drone #1 510 is capable of continuing the programmed mission.

Continuous Cycle Operations (Step 430): The GCS 550 will monitor the readiness and operational conditions of the two drones, cycling between drones as detailed above until the mission is complete (Step 450).

The process as described uses only two drones cycling between mission duty and preparation for mission duty, but the process is not limited to merely two units, with the duty change predicated upon some change in operational conditions that calls for a replacement or the end of a mission.

The process described can include continuous communication with a GCS 550 with instructions coming from the GCS, or manually through a Pilot 570.

Legend of operational steps and system elements: 30 Start 50 Programming the Ground Control System 70 Programming Drone #1 110 Complete Mission 115 Ongoing Mission Drone #2 130 Drone #1 Condition Reporting 135 Re-Prepare Drone 1 140 Evaluate Monitored Conditions 145 Drone #2 Internal Check 150 Drone #1 Internal Check 170 Ongoing Mission 190 GCS Evaluation #Drone 1195 GCS Evaluation #Drone 2 210, 215 Pilot Evaluation 230 Drone Replacement 330 Move to Goal 270 Do not engage in mission 310 Drone #1 Return To Mission 315 Drone #2 Continues Mission 350 Drone #2 Relieves Drone #1 390 Continuous Cycle Preparation 430 Drone #1 readied for mission (Drone #2 relief) 450 Process continues with drones replacing each other until end user decides global mission is complete 470 End Mission 510 Drone #1 530 Drone #2 550 Ground Control System 570 Pilot.

One embodiment of the drones may be a four-rotor drone that is built to be sufficiently rugged and employ a construction allowing for quick change and repair of damaged arms.

Figure 2:
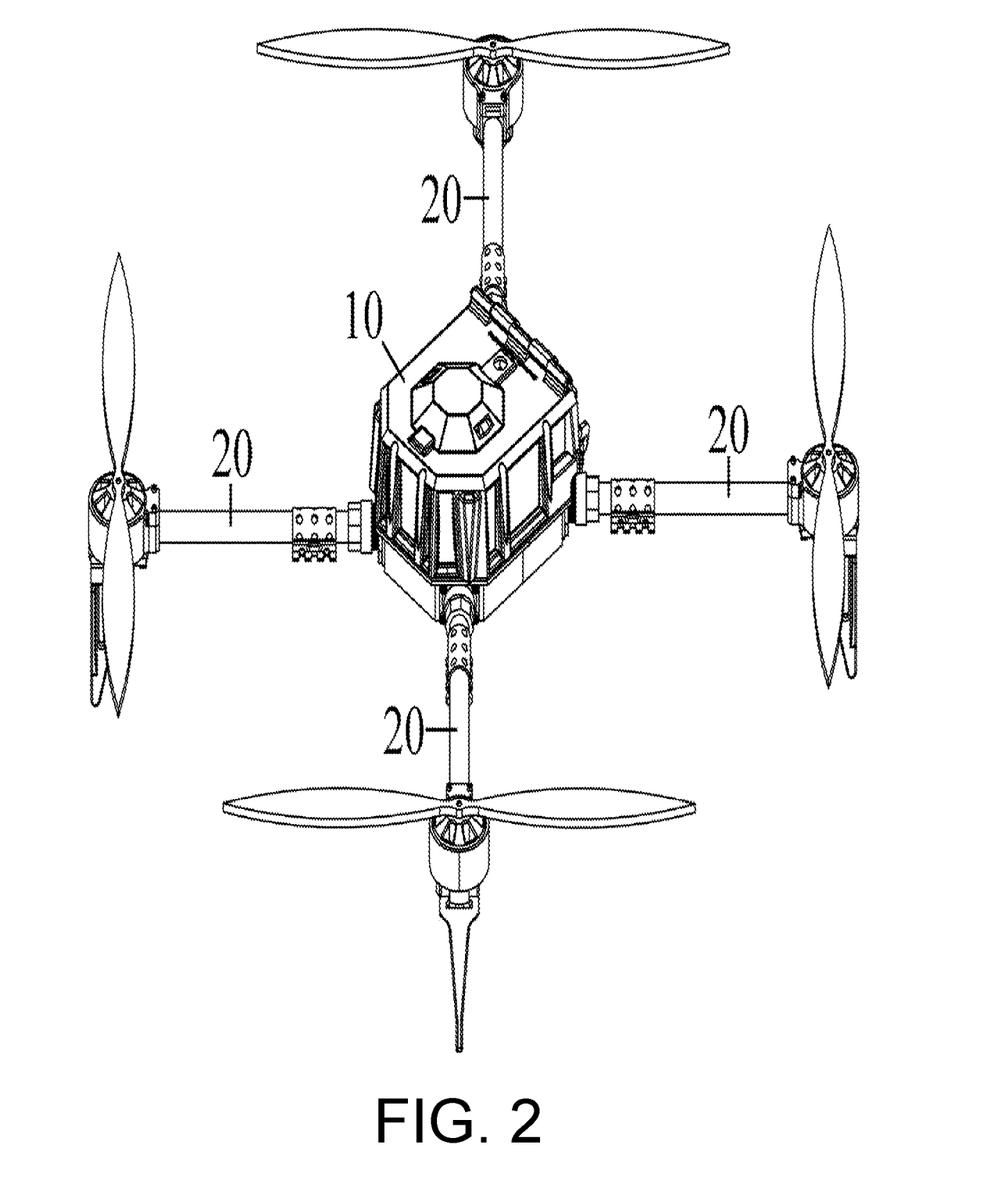
FIG. 2 shows an orthogonal perspective view of one embodiment of a four-rotor version of the invention.
Figure 3:
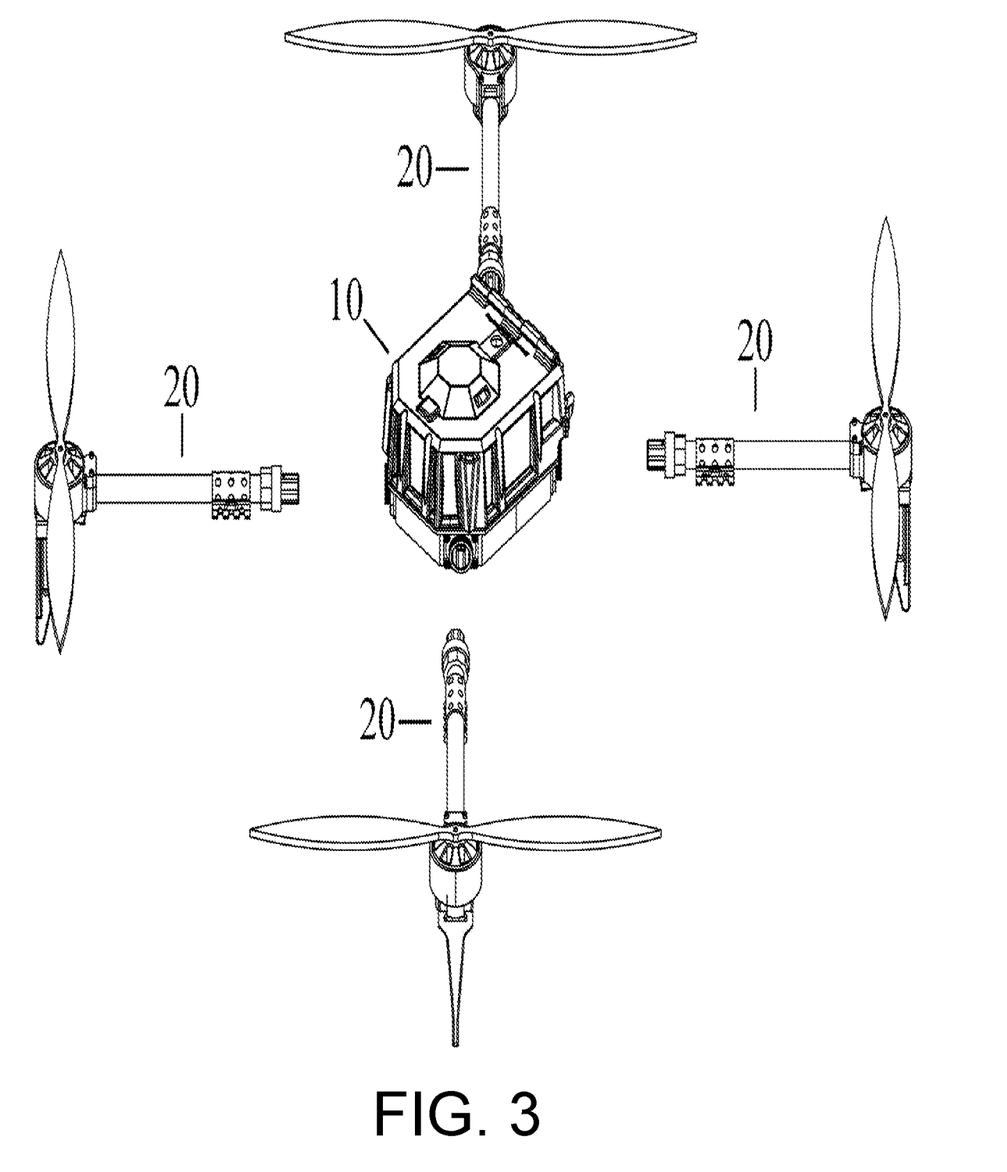
FIG. 3 shows an exploded view of the drone and central body and arm elements of the embodiment shown in FIG. 2.

FIG. 2 shows an orthogonal perspective view of one embodiment of a four-rotor version of the invention. As shown in FIG. 2, the drone 100 features a central body 10 comprising hardware for remote control and configured to receive instructions. The central body 10 comprises a plurality of connection ports to attach and secure a plurality of arms 20 that may feature a plurality of propellers 30. The arms 20 may be made of aluminum tubes 120 comprising arm rail mounts 70 to mount optics or payloads.

Figure 4:
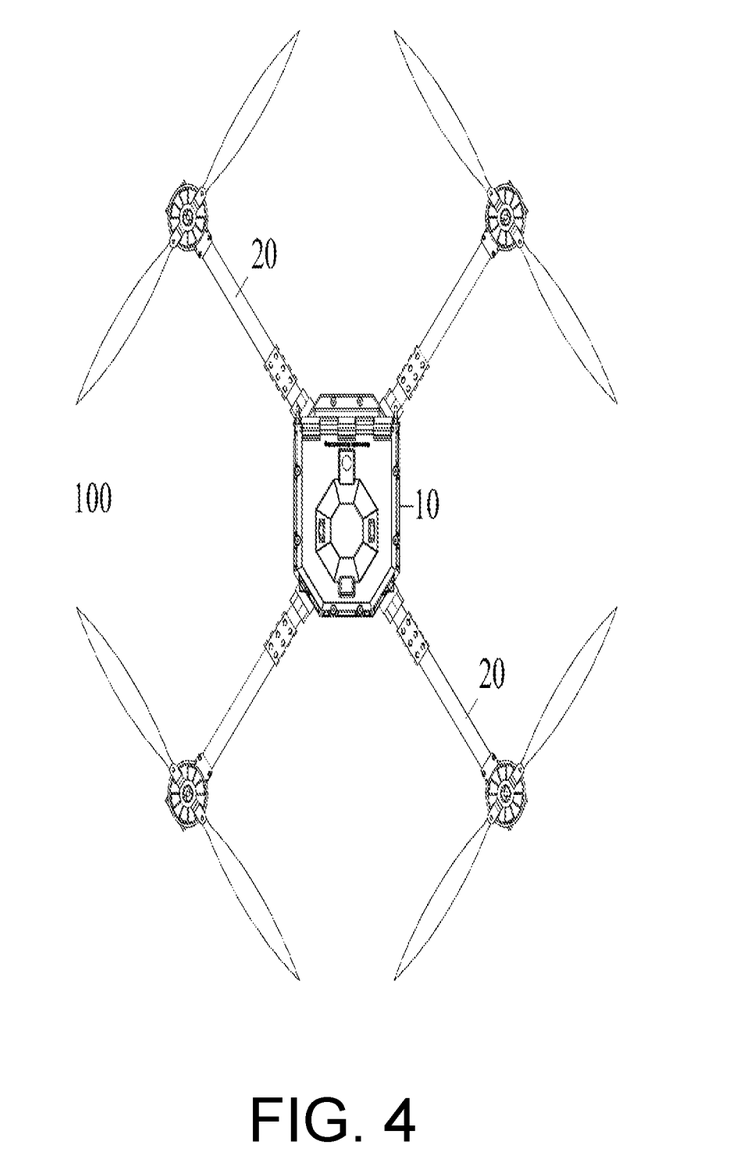
FIG. 4 shows a top view of the embodiment shown in FIG. 2.
Figure 6:
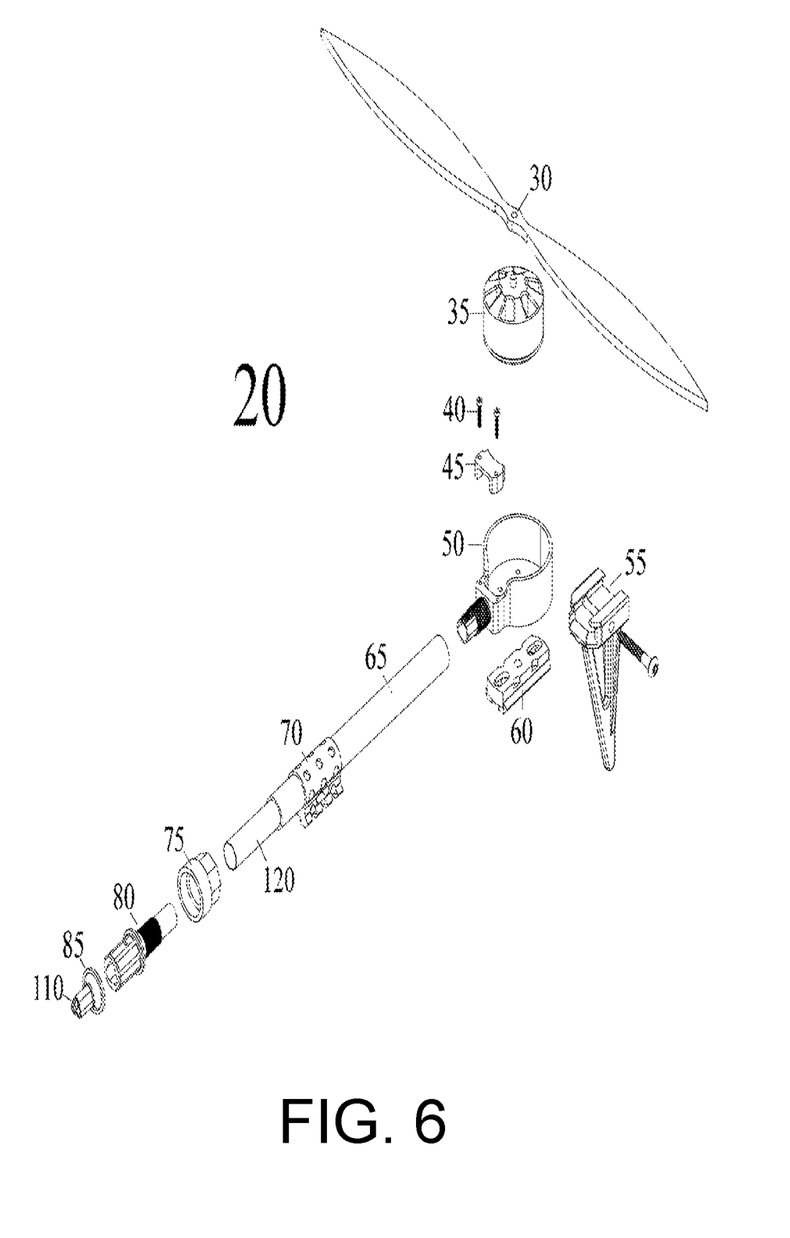
FIG. 6 shows an exploded view of an arm element from the embodiment shown in FIG. 2.

FIG. 4 shows a view of the drone 100 with a central body 10, and arm 20 elements of the embodiment shown in FIG. 2. The central body 10 comprises hardware configured to receive instructions for tasks to be executed by the drone 100 (FIG. 4). The central body 10 may comprise connection ports to attach replaceable arms 20 comprising aluminum tubes 70 (FIG. 6) and configured to hold the propellers 30 (FIG. 6). In one embodiment, the arms 20 comprise arm rail mounts 70 (FIG. 6) that may mount optics or payloads. In one embodiment, the aluminum tubes 70 (FIG. 6) may be wrapped in braids 65 made of synthetic fiber. In one embodiment, the synthetic fiber may be Kevlar®.

FIG. 4 shows a top view of the embodiment shown in FIG. 2. The drone 100 comprises a central body 10 that may be removably coupled to a plurality of arms 20 that comprise propellers 30 (FIG. 6). The arms 20 may comprise aluminum tubes 120 (FIG. 6) wrapped in Kevlar® braid 65 and may comprise arm rail mounts 70 (FIG. 6) to mount mission-related tools such as, but not limited to, optics or payloads. One of ordinary skill in the art will understand that a plurality of mission-related tools may be mounted to the arm rail mounts 70 (FIG. 6) relative to different missions and are understood herein.

Figure 5:
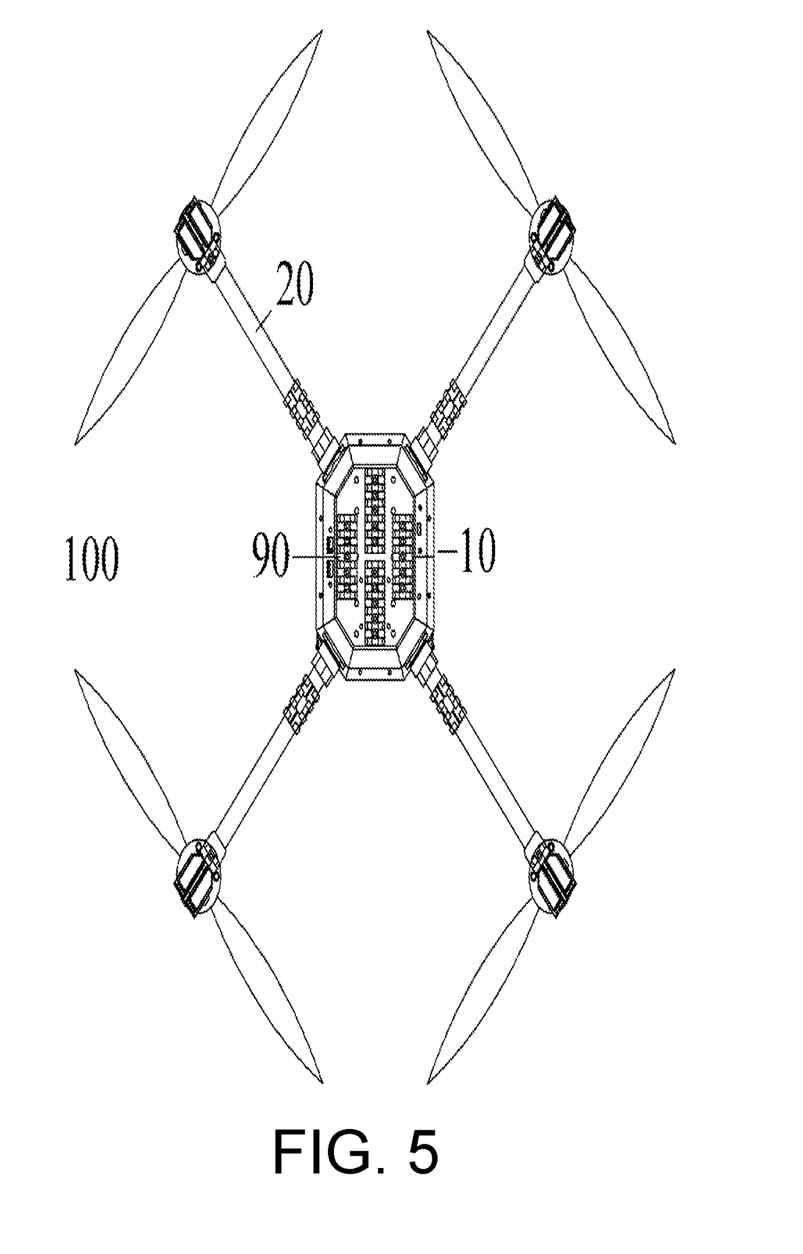
FIG. 5 shows a bottom view of the embodiment shown in FIG. 2

FIG. 5 shows a bottom view of the embodiment shown in FIG. 2. The drone 100 (FIG. 6) comprises a central body 10 and arms 20 that may be configured to removably couple to the central body and be easily replaced. The bottom of the central body 10 comprises a body rail mount 90 which may be configured to attach mission-related tools such as, but not limited to, optics or payloads.

FIG. 6 shows an exploded view of an arm 20 element from the embodiment shown in FIG. 2. The arm 20 comprises an aluminum tube base 120 wrapped in a Kevlar braid 65 and further comprises an arm rail mount 70 configured to removably attach mission-related tools such as, but not limited to, optics and payloads. The arm 20 removably couples to the central body 10. In one embodiment, the arm 20 removably couples to the central body 10 with an arm connection 75 around the aluminum tube base 120 and connection seal 80, and fitting within the central body 10 with the sealing ring 85 allowing connection of the arm 20 to the central body 10 through an electrical connection 110.

The propeller 30 may be configured to attach to a motor 35 and may be fastened to a motor mount 50 by at least one of retention bolts 40 and a retention bracket 45. A rail 60 may be attached to a bottom side of the motor mount 50 with a stand 55 sliding and fastened onto the rail 60 to hold the drone 100 in an up-right position when on the ground. In one embodiment, in response to impact from a high-velocity projectile, an arm 20 impacted by the high-velocity projectile may be removed and another functioning arm 20 may be attached. In one embodiment, the removing the impacted arm 20 and attaching the functioning arm 20 comprises transferring mission-related tools being carried on the rails 60 on the bottom side of the impacted arm 20 to rails 60 on a bottom side of the functioning arm 20. In one embodiment, the removing the impacted arm 20 and attaching the functioning arm 20 may be executed by a user. In another embodiment, the removing the impacted arm 20 and attaching the functioning arm 20 may be executed by a user, for example, at a control station.

Figure 7:
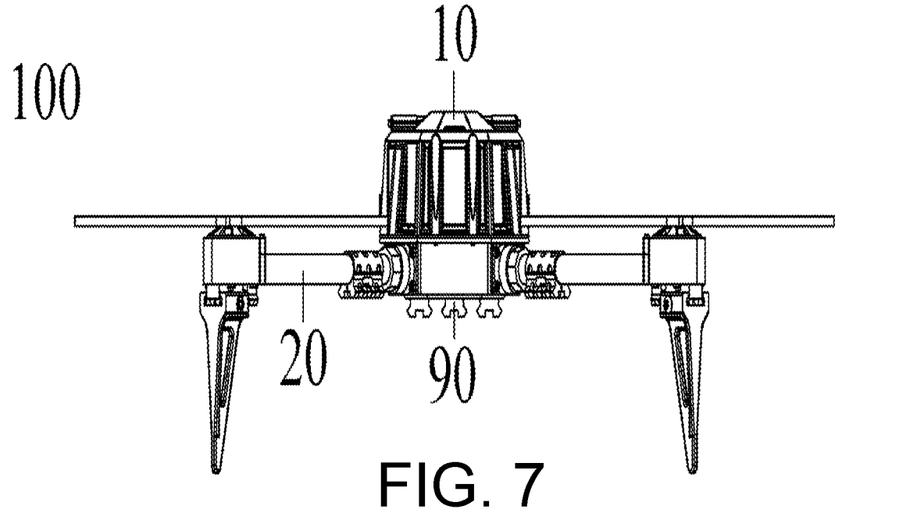
FIG. 7 shows a front view of the embodiment shown in FIG. 2.

FIG. 7 shows a front view of the drone 100 from the embodiment shown in FIG. 2. The central body 10 may be attached to arms 20 and comprises a body rail mount 90 on a bottom side to attach mission-related tools such as, but not limited to, optics and payloads.

Figure 8:
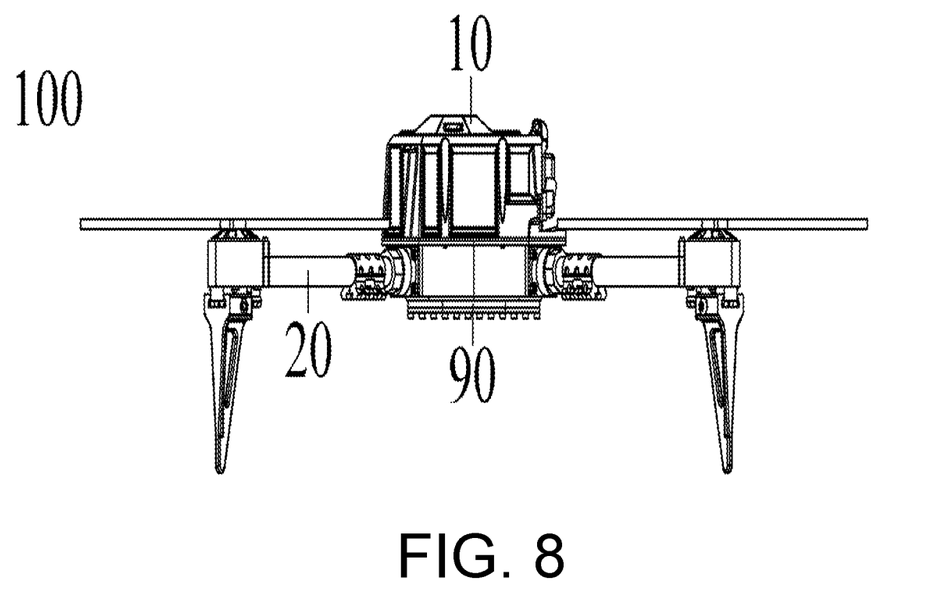
FIG. 8 shows a side view of the embodiment shown in FIG. 2.

FIG. 8 shows a side view of the drone 100 from the embodiment shown in FIG. 2. The drone 100 comprises a central body comprising hardware to receive instructions and may be attached to arms 20. A bottom of the body 10 may comprise a body rail mount 90 to attach mission-related tools such as, but not limited to, optics and payloads.

Figure 9:
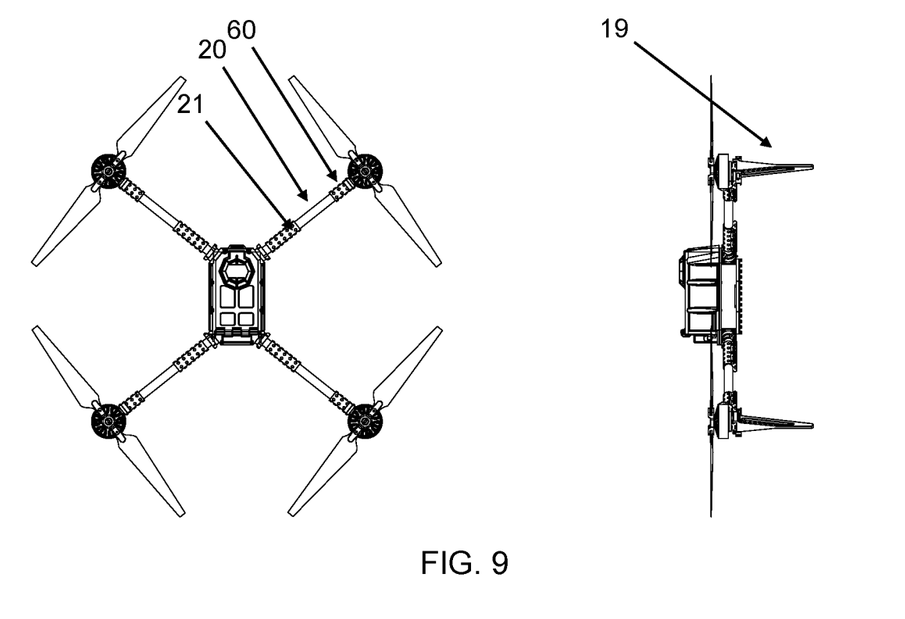
FIG. 9 shows a top view and side view of the invention.

FIG. 9 shows another illustration of a drone 100 that is designed to be crashed and still be able to fly with basic repairs (if any is needed). Drone 100 may have a housing that is aluminum, so the entire drone serves as a heat sink for the CPU and other items that would normally generate huge amount of heat—enough to actually shut the drone off. Though use of the drone body itself as a heatsink we are able to fly in extremely hot environments such as places other drones fail—deserts, hot industrial environments, etc.

Figure 10:
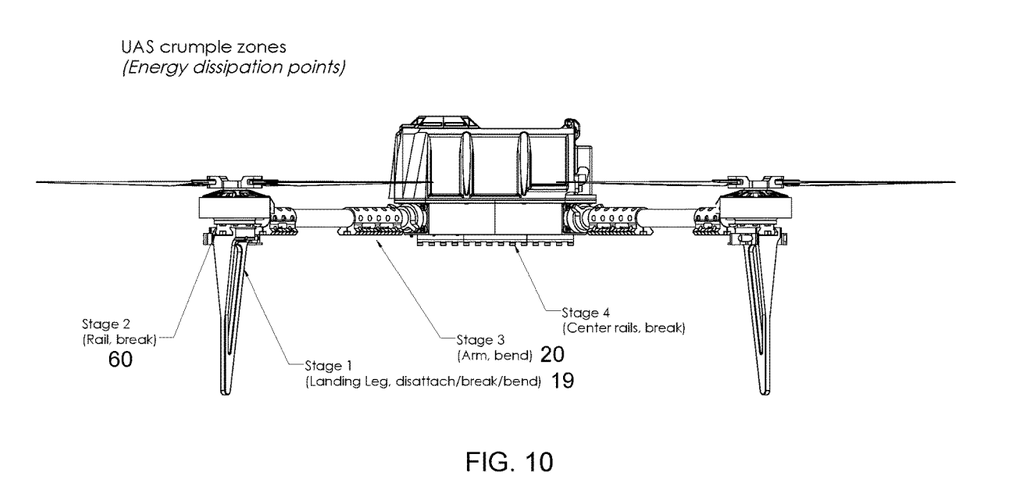
FIG. 10 shows the crumple zones.
Figure 11:
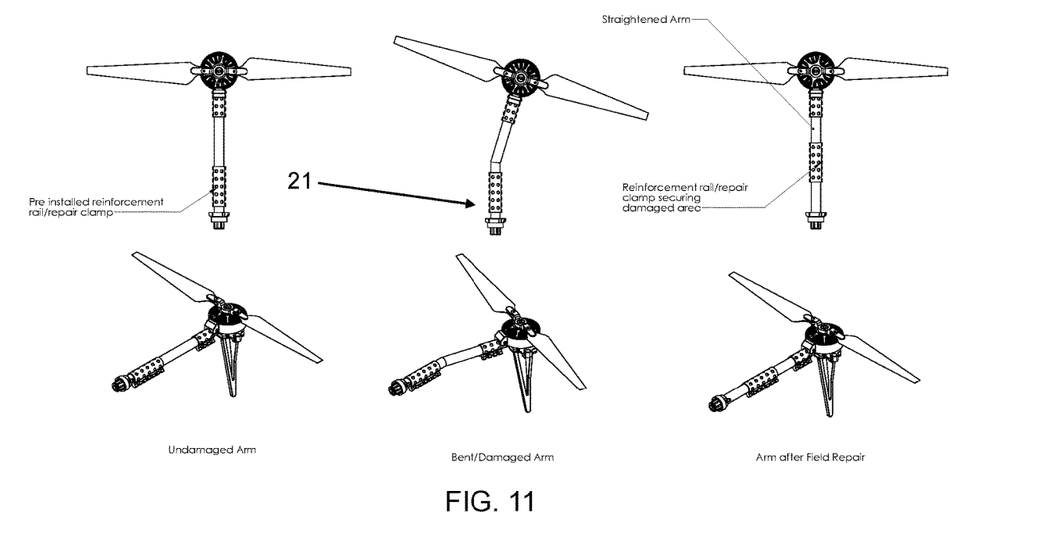
FIG. 11 shows the movement of the arms.

Legs 19, arms 20, and rails 60 have been created to absorb impact and/or break to deny excess force from being transferred into the electronics and computer contained in the main housing of drone 100. Legs 19 are detachable and designed to break off. Arms 20 are designed to bend (crumple zone) and be bent back straight and fly again as illustrated in FIGS. 10 and 11. Arms 20 may have one or more clamps or rails 21 that are made to both absorb shock and break to allow protection of both the items it is carrying and also the main drone CPU system (as stated above). Arms 20 may have one or more aluminum clamps or rails 21 that may be moved over a length of arms 20 to cover a straightened bend or damaged area in the arm, providing a functioning "cast" over the weakened area, allowing for in-field repair and continuance of flying on mission without replacing arm 20 with a new one. Arms 20 may be made of many materials such as but not limited to a Kevlar weave/carbon fiber combination that slides over a very tightly fitting aluminum substructure that allows for increased ruggedization while also allowing for the bend/rebend characteristics discussed above. Drone 100 may carry and release other drones in flight.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. An autonomous vehicle system, comprising: a central body; a plurality of arms removably coupled to the central body at inner ends of the plurality of arms wherein the plurality of arms extend laterally outward in opposing directions; and wherein each of the plurality of arms comprises: a propeller coupled to an outer end of the arm; wherein the plurality of arms each have a brace that covers a straightened bend or damaged area of the arm wherein the brace is in a first configuration positioned at a first length of the arm in a first state where the arm is undamaged and in a second configuration positioned at the first length of the arm in a second state where the arm is damaged and in a third configuration positioned at a second length of the arm over the straightened bend or damaged area in a third state wherein the brace provides reinforcement to mimic the first state wherein no other parts of the autonomous vehicle system are moved.

* * * * *